Dec. 26, 1950      F. R. JACKSON      2,535,210
JAR CLAMP
Filed Oct. 4, 1947
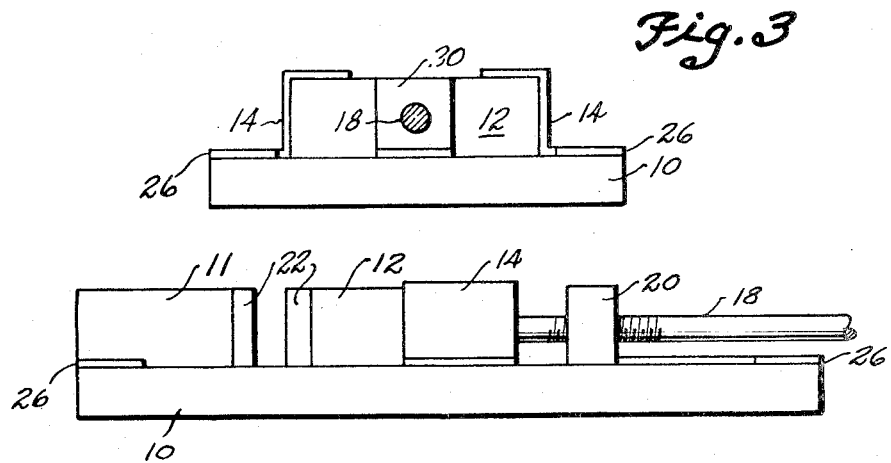
Fig. 3
Fig. 2
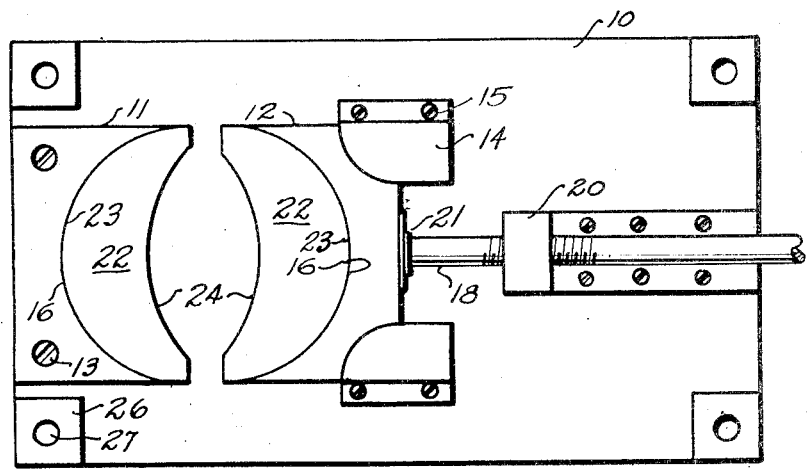
Fig. 1
INVENTOR.
Foyster R. Jackson
BY Daniel G. Cullen
Attorney Patented Dec. 26, 1950

2,535,210

UNITED STATES PATENT OFFICE 2,535,210

JAR CLAMP

Foyster R. Jackson, Hazel Park, Mich.

Application September 4, 1947, Serial No. 772,188

1 Claim. (Cl. 81—3.32)

This application relates to jar clamps and more particularly to means for clamping fruit jars or the like to a table top whereby the lid of the jar may be rotated freely with respect to the jar, either for tightening or loosening, with the jar held firmly during such operation.

A particular object of the invention is to provide a jar clamp of such a form that it will receive and clamp in place fruit jars ranging anywhere from one pint to one gallon in size.

A presently preferred embodiment of the invention is disclosed in the appended drawing. In this drawing, Fig. 1 is a top plan view of a jar clamp according to the invention.

Fig. 2 is a front elevation.

Fig. 3 is a right end view.

Referring to the drawing, it will be seen that Fig. 1 shows a jar clamp comprising a base 10 upon which are mounted complementary jaws 11—12, one of which is fixed to the base, as by screws 13, and the other of which is slidably mounted on the base within guides 14 fixed to the base, as by screws 15. The jaws are in the form of wooden blocks having facing semi-circular edges 16.

For moving jaw 12, there is provided a screw bolt 18 rotatably mounted in a bearing block 20 and having one end loosely connected at 21 to the slidable block 12 whereby rotation of the screw bolt 18 will cause the slidable block 12 to slide towards or away from the fixed block 11. A handle (not shown) is provided on the end of the screw bolt 18 for rotating it.

In order that the blocks hereof may clamp in place fruit jars of various sizes, liners 22 for the edges 16 of the wooden blocks 11—12 have been provided. These comprise rubber pads having semi-circular edges 23 engaging the semi-circular edges 16 of the blocks. The jar engaging surfaces of the pads are in the form of arcuate edges 24. The radius of curvature of the arcuate edges 24 of the pads which engage the fruit jaws is greater than the radius of curvature of the semi-circular edges 23—16 of the pads and of the blocks and the centers of curvature of the block and pad edges are on the same straight line, a line coincident with the axis of the screw bolt 18. Thus the pads are thicker at their centers than at their ends and thus, because of their form and their resiliency, enable jars of various sizes to be clamped properly to the base.

The base, in turn, is provided with bearing plates 26 at its four corners, each having a dimple or depression 27, for facilitating clamping of the base to a table top, as by C clamps, not shown here.

The particular configuration of the edges of the blocks and of the pads, it will be observed, facilitates the clamping of fruit jars of various sizes to the base and thus to the table top to which the base is clamped. When such jars are clamped in place, their lids may be moved freely with respect to the jars, either for tightening or loosening the lids.

Now having described the jar clamp herein disclosed, reference should be had to the claim which follows for a determination of the invention.

I claim:

A jar clamp comprising a base, complementary jaws thereon, one of which is fixed thereto and the other of which is slidably mounted thereon, said jaws being in the form of wooden blocks having facing semi-circular edges, and liners for such edges comprising rubber pads, screw means for moving the slidable block and its pad towards and away from the fixed block and its pad, said liners having semi-circular edges engaging the semi-circular edges of the blocks and having arcuate work engaging edges of a radius of curvature greater than the radius of curvature of their semi-circular edges, the centers of curvature of the block and pad edges being on the same straight line, coincident with the axis of the screw means, whereby the pads are wider at their centers than at their ends.

FOYSTER R. JACKSON.

REFERENCES CITED

The following references are of record in the file of this patent:

UNITED STATES PATENTS

| Number | Name | Date |
|---|---|---|
| 354,705 | Kenderdine | Dec. 21, 1886 |
| 807,613 | Graves | Dec. 19, 1905 |
| 901,618 | Honstein | Oct. 20, 1908 |
| 1,260,157 | Denton | Mar. 19, 1918 |
| 1,409,650 | Beedham | Mar. 14, 1922 |
| 2,237,397 | Vida | Apr. 8, 1941 |